United States Patent Office 3,105,071
Patented Sept. 24, 1963

3,105,071
NITRO 2-OXO-2H-1,4 BENZOXAZINES
Robert B. Moffett, Kalamazoo, Mich., assignor to The Upjohn Company, Kalamazoo, Mich., a corporation of Delaware
No Drawing. Filed June 1, 1962, Ser. No. 199,240
3 Claims. (Cl. 260—244)

This invention relates to new chemical compounds and to a process for preparing the same and is particularly directed to lower-alkyl esters of nitro-2-oxo-2H-1,4-benzoxazine-3-lower-alkanoic acids and the preparation thereof.

The novel compounds of the invention have the following structural formula:

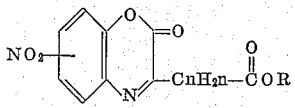

wherein $n$ is an integer from 1 to 7, inclusive, and R is lower-alkyl, e.g., methyl, ethyl, propyl, butyl, amyl, hexyl, heptyl, and octyl, and the isomeric forms thereof.

The novel compounds of the invention are prepared by condensing a 2-aminonitrophenol with a di-lower-alkyl α-ketodicarboxylate according to the following equation:

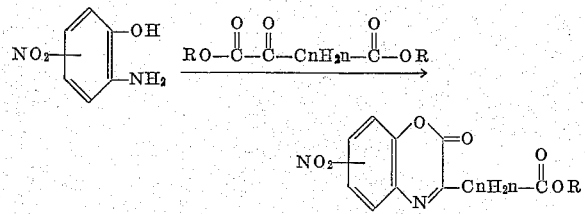

wherein $n$ and R have the significance defined above.

The condensation is accelerated by gentle heating (from room temperature, about 25° C., to about 150° C.) and advantageously is carried out in a non-oxidizing atmosphere, for example, nitrogen. The proportions of reactants can be varied over a wide range. Stoichiometric amounts are suitable though sometimes it is desirable to use an excess of one or the other reagent, say up to about 100 percent excess. An inert solvent, for example, toluene, ethanol, dioxane, tetrahydrofuran, and ethyl acetate can be used if desired. The reaction mixture can be homogeneous or heterogeneous.

The novel compounds of the invention have tranquilizing and analgetic activity and can be used to calm agitated mammals and other animals. For example, ethyl 7-nitro-2-oxo-2H-1,4-benzoxazine-3-acetate gives over 60 percent reduction of motor activity in mice when administered at doses as low as 10 percent of the $LD_{50}$. They are also active in reducing body lipids. For example, the above ester gives 24 percent reduction of total body lipids when administered intraperitoneally to mice for 3 days at a dose of 20 percent of the $LD_{50}$. The $LD_{50}$ in mice is 1000 mg./kg.

The compounds of the invention are also useful for light filters, giving strong absorption bands in the vicinity of 260, 310, and 380 millimicrons. For this purpose they can be used in solutions, suspensions, ointments, or they can be dispersed in plastic films.

The invention can be more fully understood by reference to the following examples which are given by way of illustration and not of limitation. Parts and percentages are by weight unless otherwise specified.

Example 1.—*Ethyl 7-Nitro-2-Oxo-2H-1,4-Benzoxazine-3-Acetate*

A suspension of 44.1 g. (0.21 mole) of the sodium salt of diethyl oxalacetate in approximately 200 ml. of absolute ether was acidified with 16.7 ml. (0.2 mole) of concentrated hydrochloric acid and shaken for ½ hour. The neutral ether solution was filtered through anhydrous sodium sulfate and the ether was evaporated in vacuo. The oily diethyl oxalacetate thus obtained was mixed with 15.4 g. (0.1 mole) of 2-amino-5-nitrophenol and the mixture was heated under nitrogen in an oil bath at 110–120° C. with stirring for 40 minutes. Most of the solid dissolved and then crystals separated. 200 ml. of 95 percent ethanol was added and the mixture was heated to boiling and filtered, giving 23 g. of yellow solid. This was recrystallized from 150 ml. of dimethylformamide, giving 18.7 g. of ethyl 7-nitro-2-oxo-2H-1,4-benzoxazine-3-acetate in the form of yellow needles, M.P. 190–192° C.

*Anal.*—Calcd. for $C_{12}H_{10}N_2O_6$: C, 51.80; H, 3.62; N, 10.07; O, 34.51. Found: C, 51.99; H, 3.93; N, 10.53; O, 34.91.

UV in ethanol:

258 mμ; $a=20.7$
314 mμ; $a=19.6$
380 mμ; $a=79.2$

In place of 2-amino-5-nitrophenol there can be substituted 2-amino-4-nitrophenol, 2-amino-3-nitrophenol, and 2-amino-6-nitrophenol to give the ethyl esters of 6-nitro-, 5-nitro-, and 8-nitro-2-oxo-2H-1,4-benzoxazine-3-acetic acids, respectively. In place of the diethyl ester of oxalacetic acid there can be substituted any other di-lower-alkyl oxalacetate, e.g., the methyl, propyl, isopropyl, butyl, sec. butyl, amyl, isoamyl, heptyl, 2-ethylhexyl, and octyl esters, to give the corresponding esters of 5-, 6-, 7-, and 8-nitro-2-oxo-2H-1,4-benzoxazine-3-acetic acids.

The above oxalacetic acid esters can be replaced by the corresponding esters of methyloxalacetic acid, dimethyloxalacetic acid, ethylmethyloxalacetic acid, and α-ketoglutaric, α-ketoadipic, α-ketopimelic, α-ketosuberic, α-ketoazelaic and α-ketosubacic acids. There are thus obtained the corresponding lower-alkyl esters of 5-, 6-, 7-, and 8-nitro-2-oxo-2H-1,4-benzoxazine - 3 - lower-alkanoic acids.

I claim:
1. A compound of the formula:

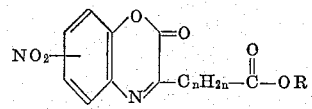

wherein $n$ is an integer from 1 to 7, inclusive, and R is lower-alkyl.
2. Lower-alkyl 7-nitro - 2 - oxo-2H-1,4-benzoxazine-3-acetate.
3. Ethyl 7-nitro-2-oxo-2H-1,4-benzoxazine-3-acetate.

References Cited in the file of this patent
FOREIGN PATENTS 815,279     Great Britain _____ June 24, 1959
203,506     Australia _____ May 25, 1959

OTHER REFERENCES

Noller: Chemistry of Organic Compounds, 2nd ed., pp. 439–40, 484–5, 507 (1957) (Saunders).